Patented June 10, 1924.

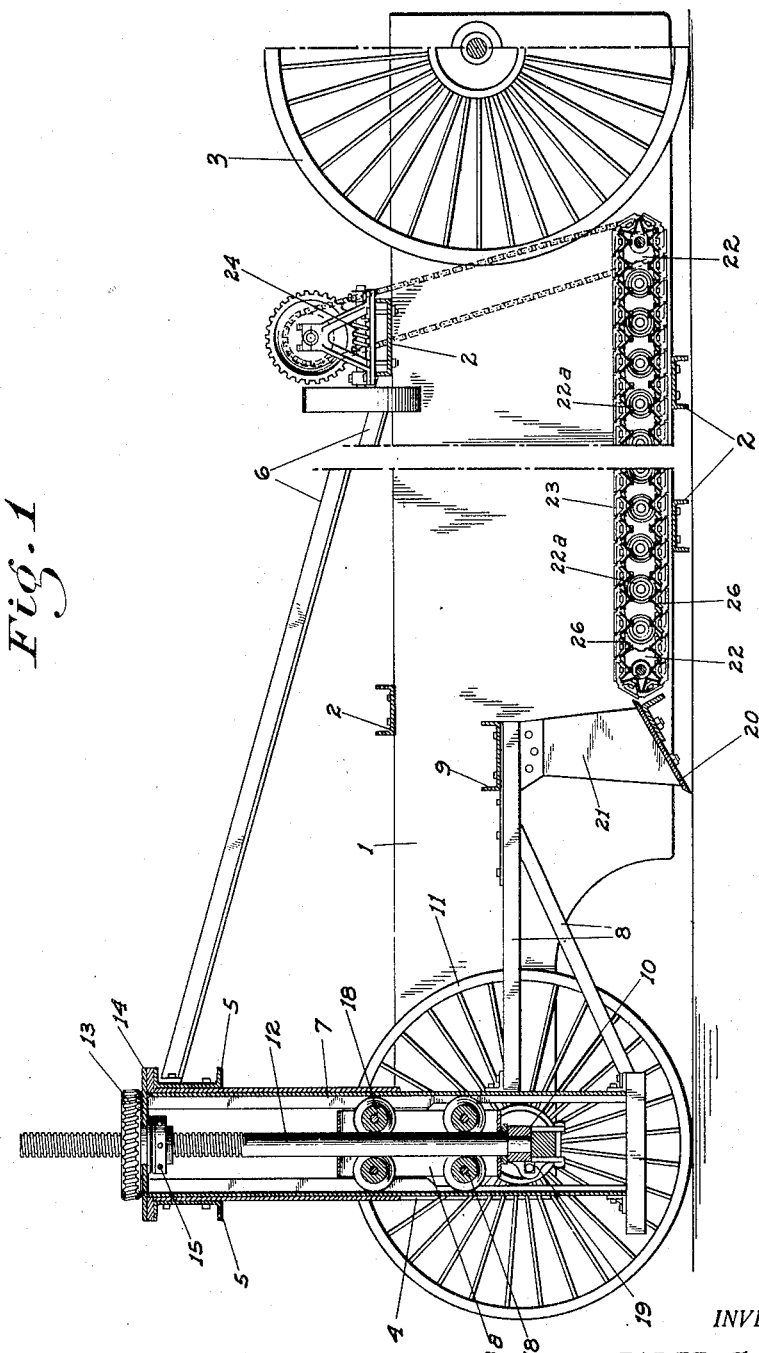

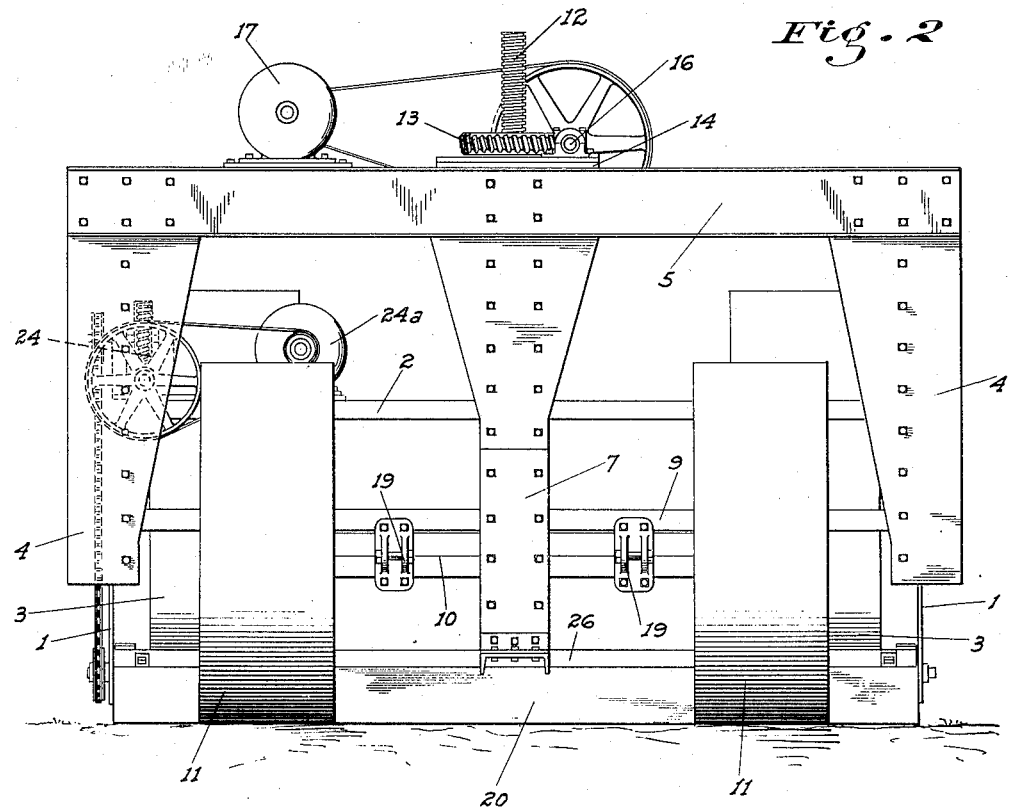
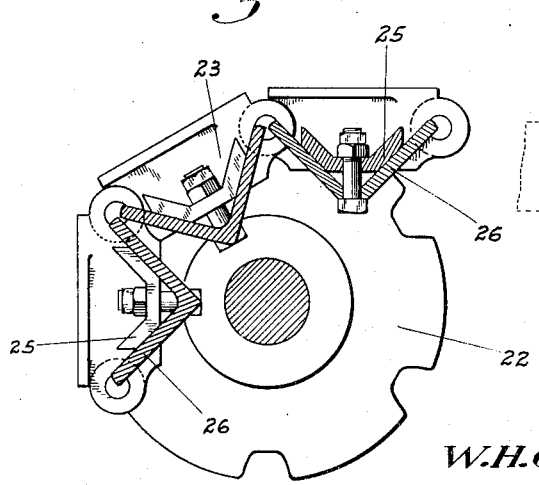
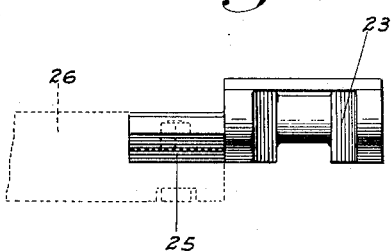

1,497,505

UNITED STATES PATENT OFFICE.

WILLIAM H. GUY, IRA D. GUY, AND ROBERT E. GUY, OF STOCKTON, CALIFORNIA.

SCRAPER.

Application filed May 16, 1923. Serial No. 639,292.

*To all whom it may concern:*

Be it known that we, WILLIAM H. GUY, IRA D. GUY, and ROBERT E. GUY, citizens of the United States, residing at Stockton, county of San Joaquin, State of California, have invented certain new and useful Improvements in Scrapers; and we do declare the following to be a full, clear, and exact description of the same, reference being had to the accompanying drawings, and to the characters of reference marked thereon, which form a part of this application.

This invention relates to improvements in scrapers, and particularly to scrapers of large size, to be drawn by tractors.

Most scrapers now built, as far as we are aware, are not designed to efficiently utilize all the available power of the tractor both in scraping and carrying a load. The power necessary to scrape the dirt and pile it up in an ordinary scoop merely by the pressure of the incoming dirt as this is scraped is so great that the total load which can thus be placed in the scoop is limited, and is much less than the tractor could haul when once loaded on wheels. The total power of a tractor therefore is necessary to scrape a load, and but roughly half of the power to haul the scraped load to the dumping place. In other words, the tractor is scraping and hauling only half or less than half of a load which it could scrape if only the dirt, as it was scraped, could be moved toward the rear of the scoop leaving the front of the scoop clear for the incoming dirt.

Also all scrapers, as far as we are aware, are so constructed that the scoop must be lifted and tilted to a certain angle to dump, which in large machines not only necessitates a framework of considerable height, but calls for a great expenditure of power to lift the dead load of dirt.

The principal object of our invention therefore is to avoid and eliminate the above named defects by providing a wheel-mounted scraper so constructed that the dirt as scraped, may be moved rearwardly from the scraping edge, mechanically and with a minimum of power and friction, so that the depth of the dirt supporting member is limited only by the weight of a load which the tractor attached to the scraper may haul on wheels.

Another important object is to provide means for enabling the load to be dumped without raising any part of the scraper, and from either the front or rear of the same, so that even in a scraper of great dirt carrying capacity, it may be built relatively low.

These objects we accomplish by means of such structure and relative arrangement of parts as will fully appear by a perusal of the following specification and claims.

In the drawings similar characters of reference indicate corresponding parts in the several views:

Fig. 1 is a longitudinal section of the scraper, broken out intermediate its ends.

Fig. 2 is a front end view of the same.

Fig. 3 is an enlarged fragmentary view of a special form of conveyor and driving chain.

Fig. 4 is an end view of one of the chain links.

Referring now more particularly to the characters of reference on the drawings, the numeral 1 denotes a vertical pair of longitudinally disposed and transversely spaced side plates, of suitable dimensions, connected together at intervals by cross beams 2 at top and bottom.

The bottoms of these plates are clear of the ground and they are supported at the rear by wheels 3.

The front ends of the plates are connected by means of vertical and transversely disposed plates 4 to the forward one of two horizontally spaced transverse beams 5, connected together to form a rigid unit by any suitable means, said beams 5 being a certain distance above the plates 1, and having braces 6 extending rearwardly therefrom to said plates.

Depending from the beams 5 centrally of the length thereof and rigidly connected thereto is a hollow structural column 7, braces 8 extending rearwardly therefrom to a cross beam 9 extending between and connected to the plates 1 intermediate their upper lower edges.

Passing through the column 7 is the horizontal axle 10 of the front wheels 11, said axle being turnably mounted on the lower end of a screw 12 projecting upwardly and threaded through a worm wheel 13 mounted above a plate 14 on top of the column and secured on the beams 5, the hub of said wheel projecting through said plate and having a thrust bearing 15 under said plate. This screw and the thrust bearing therefore support the weight of the front end of the plates 1 and parts connected thereto, and it will be evident that on turning the worm wheel, the latter will be moved up and down on the screw, raising and lowering the forward ends of the plates 1. Rotative movement is imparted to the wheel 13 by means of a shaft 16 having a worm thereon (not shown) this shaft being driven from an electric motor 17 mounted on the beams 5.

Wobbling movement of the lower end of the screw is prevented by means of rollers 18 bearing against the inner faces of the column 7 and mounted in a frame 18ª supported by the axle 10.

Eye members 19 are mounted on the axle 10 on both sides of the column 7, and from which connection is made to a tractor. In this manner the wheels, which are placed inwardly of the side plates a suitable distance, are turned to steer the scraper when the tractor is steered.

Extending between the plates 1 under the cross beam 9 is a rigid scraping blade 20, set at a suitable downward and forward angle to the ground, and preferably braced from the cross beam 9 by a rigid plate 21, disposed so as to offer the least resistance to the passage of dirt therepast.

Journaled in the plates 1 to the rear of the blade 20 are horizontally alined sprocket wheels 22, the forward ones of which are close behind the blade and the rear ones being just forward of the rear wheels. Endless chains 23 pass over these sprockets, certain of which are driven in either direction by a suitable mechanism 24 operated by an electric motor 24ª mounted on one of the cross beams 2. Idler rollers 22ª support the chains at intervals in its length.

The chains are provided with side pads 25 projecting therefrom, to which are secured transversely extending V-shaped channel members 26 whose median lines are at right angles to the longitudinal lines of the links, and whose axes project inwardly of the sprocket wheels.

These channels are so arranged that their outer edges are about in line with the pivots of the links, so that there is never any greater spacing between any two channels whether the links are in a straight line or rounding the sprockets. Neither is there any chance for any dirt which may pass therebetween to exert any breaking pressure when the links straighten out.

An endless platform is thus formed, which is the supporting surface for the dirt scraped up by the blade, the platform of conveyor being so disposed relative to the blade that there is but a slight if any rise from the blade onto the conveyor.

The particular shape of the channels or slats used not only provides a rigid and substantial structure with a minimum of weight, but by providing a continuous series of pockets in which the lower layer of dirt rests, insures that the entire body of dirt will be moved rearwardly when the conveyor is moved, and that the latter will not slip under the dirt.

In operation, the blade 20 is set at a desired scraping depth by raising and lowering the plates, by means of the worm and screw, as previously described.

With the forward movement of the scraper, dirt from the blade will be shoved up onto the conveyor, the latter being then stationary.

When the pile has assumed such proportions that undue friction and resistance to further piling becomes apparent, the conveyor is moved rearwardly a certain distance, carrying the initially piled dirt therewith and clearing the conveyor adjacent the blade for a further pile therefrom. This intermittent movement of the conveyor may be had until the dirt is adjacent the rear end of the conveyor, when the scraper will have been of course loaded to capacity, and if the movement of the conveyor has been properly controlled, this load will be in the form of a substantially flat-topped heap of dirt, with natural slopes at both ends, and in condition to be transported any desired distance, upon the raising of the blade 20 from the ground.

To unload the scraper, the rearward movement of the conveyor is continued, combined with a forward movement of the scraper, and the dirt is deposited evenly over the ground, as is usually desired, at the rear of the scraper. If desired however, the conveyor may be run in a forward direction, and the dirt discharged from the forward instead of the rear end.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A scraper comprising front and rear wheels, transversely spaced side plates extending therebetween, the rear wheels being directly attached to the plates, a scraping structure mounted as a unit with and between the plates, a vertical spindle supported by the front wheels, and supporting the plates at their forward ends, and means whereby the level of the point of support of said plates with the spindle may be altered at will.

2. A scraper comprising front and rear wheels, transversely spaced side plates extending therebetween, the rear wheels being directly attached to the plates, a scraping structure mounted as a unit with and between the plates, a turnable and vertical spindle supported by and projecting upwardly from the front wheels and also supporting the plates at their forward end, means for rotating said spindle, and means whereby with such rotation the adjacent end of the plates will be raised or lowered.

3. A scraper comprising front and rear wheels, transversely spaced side plates, extending therebetween, the rear wheels being directly attached to the plates, a scraping structure mounted as a unit with and between the plates, a turnable and vertical spindle supported by and projecting upwardly from the front wheels and also supporting the plates at their forward end, said spindle being threaded, a wheel through which the threaded spindle engageably passes, said wheel being supported by the plates and held in fixed relation thereto, and means for rotating said wheel.

4. A scraper including front and rear wheels, side members pivoted axially of the rear wheels, and supported for vertical adjustment from a point directly above the axis of the front wheels.

5. A scraper including front and rear wheels, side members pivoted axially of the rear wheels, a dirt supporting surface mounted on and between said side members, and means for supporting the front end of said members in a manner to allow them to be vertically adjusted relative to the front wheels, the axis of the rear wheels being to the rear of the dirt supporting surface, whereby when the front end of the said surface is lowered the rear end thereof will be lowered also.

6. A scraper including front and rear wheels, side members pivoted axially of the rear wheels, a dirt supporting surface mounted on and between said side members, an axle extending between the front wheels, a turnable and vertical spindle projecting up from and supported by said axle and about which the latter is turnable, and means between said spindle and the side members for supporting the latter and for enabling vertical adjustment of the latter being had.

7. A scraper including front and rear wheels, side members pivoted axially of the rear wheels, a dirt supporting surface mounted on and between said side members, an axle extending between the front wheels, a turnable and vertical spindle projecting up from and supported by said axle and about which the latter is turnable, means between the spindle and side members for supporting the latter, and draft connection means on the axle on both sides of the spindle.

In testimony whereof we affix our signatures.

WILLIAM H. GUY.
IRA D. GUY.
ROBERT E. GUY.